United States Patent
Nakajima

(10) Patent No.: US 7,292,724 B2
(45) Date of Patent: Nov. 6, 2007

(54) IMAGE PROCESSING APPARATUS AND IMAGE PROCESSING METHOD

(75) Inventor: Takashi Nakajima, Iwatsuki (JP)

(73) Assignee: Fuji Xerox Co., Ltd., Tokyo (JP)

(*) Notice: Subject to any disclaimer, the term of this patent is extended or adjusted under 35 U.S.C. 154(b) by 725 days.

(21) Appl. No.: 10/866,833

(22) Filed: Jun. 15, 2004

(65) Prior Publication Data

US 2005/0094872 A1    May 5, 2005

(30) Foreign Application Priority Data

Oct. 29, 2003 (JP) ............................ 2003-368758

(51) Int. Cl.
- G06K 9/00 (2006.01)
- G06K 1/00 (2006.01)
- G06F 15/00 (2006.01)
- G03G 15/01 (2006.01)
- G03G 15/04 (2006.01)

(52) U.S. Cl. ............... 382/162; 382/276; 358/1.9; 358/501; 358/518; 399/39; 399/177; 399/222; 345/589; 348/268

(58) Field of Classification Search ........ 382/162–167, 382/276, 286; 358/1.9, 3.01, 3.21, 501, 512, 358/515, 518–527, 401, 302, 455, 457; 345/589–592, 345/596–605; 399/28, 31, 38–39, 58–59, 399/177–184, 222–224, 298–301, 344; 348/32–34, 348/210.99, 223.1, 253, 256, 268–274, 576–577

See application file for complete search history.

(56) References Cited

U.S. PATENT DOCUMENTS

| 4,060,829 | A | * | 11/1977 | Sakamoto ................. 358/523 |
| 4,409,614 | A | * | 10/1983 | Eichler et al. ............. 358/530 |
| 4,959,711 | A | * | 9/1990 | Hung et al. ................ 358/523 |
| 4,989,079 | A | * | 1/1991 | Ito ........................... 358/520 |
| 5,177,603 | A | * | 1/1993 | Kojima ..................... 358/518 |
| 5,251,024 | A | * | 10/1993 | Furukawa et al. .......... 358/523 |
| 5,305,119 | A | * | 4/1994 | Rolleston et al. ........... 358/522 |

(Continued)

FOREIGN PATENT DOCUMENTS

JP    A-2000-278544    10/2000

(Continued)

Primary Examiner—Bhavesh M Mehta
Assistant Examiner—Manav Seth
(74) Attorney, Agent, or Firm—Oliff & Berridge, PLC

(57) ABSTRACT

The present invention provides an image processing apparatus on which an image forming engine for forming a full-color image by using color materials corresponding to data of color tones on the basis of C (cyan), M (magenta), Y (yellow), and K (black) data is mounted. The image processing apparatus includes: a color converting component for converting R (red), G (green), and B (blue) data input from the outside to $C_{(1)}$, $M_{(1)}$, and $Y_{(1)}$ data which depends on a characteristic of the image forming engine; a lightness acquiring component for acquiring lightness from the $C_{(1)}$, $M_{(1)}$, and $Y_{(1)}$ data obtained by the conversion of the color converting component; a memory for storing a lightness-gray value characteristic table; a gray value reading component; a first arithmetic component for obtaining $C_{(2)}$, $M_{(2)}$, and $Y_{(2)}$ data; a K data generating component; and a second arithmetic component for calculating C, M, and Y.

8 Claims, 9 Drawing Sheets

U.S. PATENT DOCUMENTS

| | | | |
|---|---|---|---|
| 5,329,385 A | * | 7/1994 | Washio ........................ 358/515 |
| 5,402,253 A | * | 3/1995 | Seki ............................ 358/518 |
| 5,428,465 A | * | 6/1995 | Kanamori et al. ........... 358/518 |
| 5,710,824 A | * | 1/1998 | Mongeon ..................... 382/162 |
| 6,014,457 A | * | 1/2000 | Kubo et al. .................. 382/167 |
| 6,160,912 A | * | 12/2000 | Usami ......................... 382/167 |

FOREIGN PATENT DOCUMENTS

| JP | A-2002-218723 | 8/2002 |
|---|---|---|

* cited by examiner

IMAGE PROCESSING APPARATUS AND IMAGE PROCESSING METHOD

CROSS-REFERENCE TO RELATED APPLICATION

This application claims priority under 35 USC 119 from Japanese Patent Application No. 2003-368758, the disclosure of which is incorporated by reference herein.

BACKGROUND OF THE INVENTION

1. Field of the Invention

The present invention relates to an image processing apparatus on which an image forming engine for forming a full-color image on a recording medium by using color materials corresponding to color data on the basis of C, M, Y, K data is mounted.

2. Description of the Related Art

It is known to provide an image forming apparatus that receives RGB data output from a host computer or the like, converts the RGB data to CMYK data, records an electrostatic latent image onto a photosensitive member in correspondence with the color data, develops the image by using toners of the colors, and transfers the image onto a recording medium (recording paper), thereby obtains a full-color image.

In the case of generating CMYK data from RGB data, first, CMYK data is generated from RGB data. Next, when amounts of C, M, and Y are equal to each other, the equal amounts are replaced with K data. The K data amount is set as a base and subtracted from the original C, M, and Y data, thereby generating each of the C, M, and Y data.

As a conventional method of generating K data, the difference between the maximum and minimum values of CMY data is regarded as saturation information. When amounts of C, M, and Y data are equal to each other, it is determined that saturation is low, and K data is generated so as to be maximum.

In such a K data generating method, however, there is a case such that K data becomes the maximum in a color having rather low saturation. As a result, excellent color reproduction is not achieved, and a problem occurs such that tone reproducibility deteriorates and spreading occurs in a low saturation part in which the K data is generated maximally.

SUMMARY OF THE INVENTION

The present invention has been made in view of the above circumstances and provides an image processing apparatus capable of generating K data on the basis of CMY data of gray tones which becomes achromatic color according to the degree of color tone (degree of lightness, darkness, or the like) and realizing improved color reproducibility.

The invention provides an image processing apparatus on which an image forming engine for forming a full color image onto a recording medium by using color materials corresponding to data of color tones on the basis of C (cyan), M (magenta), Y (yellow), and K (black) data is mounted, the image processing apparatus including: a color converting component for converting R (red), G (green), and B (blue) data input from the outside to $C_{(1)}$, $M_{(1)}$, and $Y_{(1)}$ data which depends on a characteristic of the image forming engine; a lightness acquiring component for acquiring lightness from the $C_{(1)}$, $M_{(1)}$, and $Y_{(1)}$ data obtained by the conversion by the color converting component; a memory for storing a lightness-gray value characteristic table which depends on the characteristic of the image forming engine, is preset, and indicates gray value balance of the $C_{(1)}$, $M_{(1)}$, and $Y_{(1)}$ data with respect to lightness; a gray value reading component for reading a gray value at the lightness acquired by the lightness acquiring component, from the memory; a first arithmetic component for obtaining $C_{(2)}$, $M_{(2)}$, and $Y_{(2)}$ data by subtracting the gray values read by the gray value reading component from the corresponding $C_{(1)}$, $M_{(1)}$, and $Y_{(1)}$ data derived by conversion by the color converting component; a K data generating component for generating K data on the basis of the $C_{(2)}$, $M_{(2)}$, and $Y_{(2)}$ data; and a second arithmetic component for calculating C, M, and Y data by subtracting a base amount determined on the basis of the K data generated by the K data generating component from the $C_{(1)}$, $M_{(1)}$, and $Y_{(1)}$ data obtained by color conversion by the color converting component.

According to the invention, first, the color converting component converts R (red), G (green), and B (blue) data input from the outside to $C_{(1)}$, $M_{(1)}$, and $Y_{(1)}$ data. At this time, the color reproducibility depends on the characteristic of the image forming engine applied, so that correction has to be made with factors which are set for the image forming engine.

The lightness acquiring component acquires lightness of the $C_{(1)}$, $M_{(1)}$, and $Y_{(1)}$ data generated by conversion of the color converting component. The lightness is determined mostly by the balance of the $C_{(1)}$, $M_{(1)}$, and $Y_{(1)}$ data. For example, when the amount of color data as a whole is small (light), the lightness becomes the maximum. When the amount of color data as a whole is large (dark), the lightness becomes the minimum. The degree of a change in the lightness is an almost linear characteristic, so that lightness can be obtained from the balance of the $C_{(1)}$, $M_{(1)}$, and $Y_{(1)}$ data.

As already described in Description of the Related Art, in theory, when amounts of the $C_{(1)}$, $M_{(1)}$, and $Y_{(1)}$ data are balanced and equal to each other, gray is expressed. However, there are cases in which gray is expressed in an unbalanced state depending on the characteristic of the image forming engine. A data value does not move from the origin inherently (theoretically) but the data largely changes according to density of the colors.

The present inventor herein has found out that the gray balance has a close relationship with lightness.

Consequently, in the memory, a lightness-gray value characteristic table which depends on the characteristic of the image forming engine, is preset, and indicates gray value balance of the $C_{(1)}$, $M_{(1)}$, and $Y_{(1)}$ data with respect to lightness is prestored. The gray value reading component reads a gray value at the lightness acquired by the lightness acquiring component, from the memory.

The second arithmetic component calculates $C_{(2)}$, $M_{(2)}$, and $Y_{(2)}$ data by subtracting the gray value read by the gray value reading component from the $C_{(1)}$, $M_{(1)}$, and $Y_{(1)}$ data obtained by color conversion by the color converting component.

In this case, by subtracting the gray value, the $C_{(2)}$, $M_{(2)}$, and $Y_{(2)}$ data become small values (values close to zero). Consequently, to raise the values, for example, it is preferable to add the smallest value among the C, M, and Y data indicative of the gray values.

By using the difference between the maximum and minimum values of the $C_{(2)}$, $M_{(2)}$, and $Y_{(2)}$ data as a reference, the K data generating component generates K data by using, as factors, a K data insertion start point according to lightness and the ratio of K data according to lightness.

The K data insertion start point according to lightness denotes the upper limit value of lightness at which K data is generated. The ratio of K data according to lightness denotes a characteristic curve (by which the most appropriate value is determined according to the characteristic of the image forming engine) in which an amount of conversion to K data gradually increases as lightness decreases from the upper limit value (as it becomes darker).

Finally, the second arithmetic component calculates C, M, and Y data by subtracting a base amount determined on the basis of the K data generated by the K data generating component from the $C_{(1)}$, $M_{(1)}$, and $Y_{(1)}$ data obtained by color conversion by the color converting component.

According to the foregoing, the most appropriate K data is generated in consideration of the balance of the gray value which depends on the characteristic of the image forming engine and changes with lightness. Further, by subtracting the K data generated in such a manner as a base amount, the optimum C, M, and Y data is generated. Thus, C, M, Y, and K data with excellent color reproducibility can be obtained.

According to another aspect, the invention provides an image processing method in an image processing apparatus on which an image forming engine for forming a full color image onto a recording medium by using color materials corresponding to data of color tones on the basis of C (cyan), M (magenta), Y (yellow), and K (black) data is mounted, the image processing method comprising: (a) converting R (red), G (green), and B (blue) data input from the outside to $C_{(1)}$, $M_{(1)}$, and $Y_{(1)}$ data which depends on a characteristic of the image forming engine; (b) acquiring lightness from the $C_{(1)}$, $M_{(1)}$, and $Y_{(1)}$ data obtained by the conversion in (a); (c) storing a lightness-gray value characteristic table which depends on the characteristic of the image forming engine, is preset, and indicates gray value balance of the $C_{(1)}$, $M_{(1)}$, and $Y_{(1)}$ data with respect to lightness into a memory; (d) reading a gray value at the lightness acquired in (b), from the memory; (e) obtaining $C_{(2)}$, $M_{(2)}$, and $Y_{(2)}$ data by subtracting the gray values read in (d) from the corresponding $C_{(1)}$, $M_{(1)}$, and $Y_{(1)}$ data derived by conversion in (a); (f) generating K data on the basis of the $C_{(2)}$, $M_{(2)}$, and $Y_{(2)}$ data; and (g) calculating C, M, and Y data by subtracting a base amount determined on the basis of the K data generated in (f) from the $C_{(1)}$, $M_{(1)}$, and $Y_{(1)}$ data obtained by color conversion in (a).

As described above, the invention produces excellent effects such that K data is generated on the basis of CMY data of gray tones which becomes achromatic color according to the degree of color tone (degree of lightness, darkness, or the like) so that color reproducibility can be improved.

BRIEF DESCRIPTION OF THE DRAWINGS

Preferred embodiment of the present invention will be described in detail based on the following figures, wherein.

DETAILED DESCRIPTION OF THE INVENTION

Figure 1:
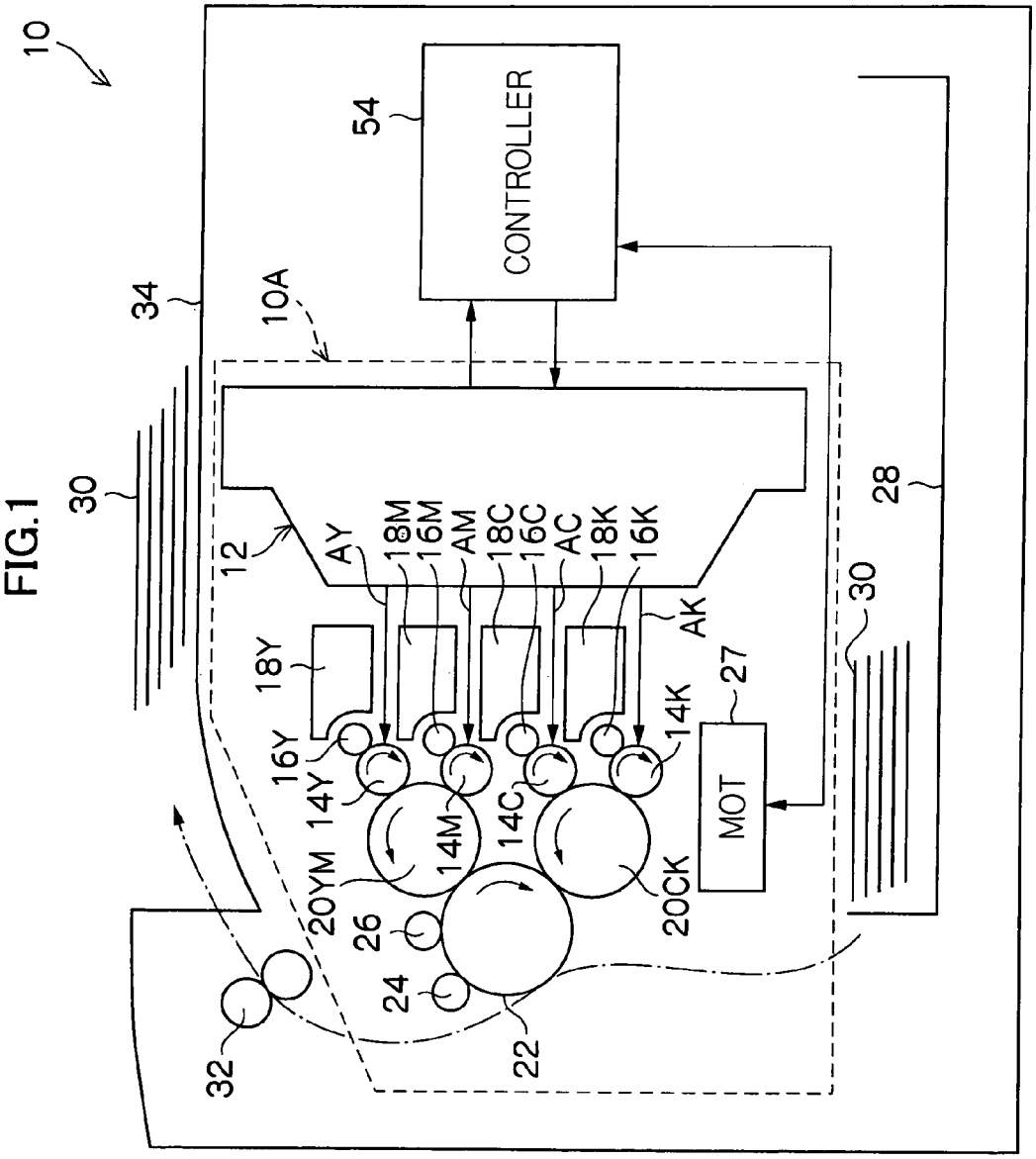
FIG. 1 is a schematic configuration diagram of an image forming apparatus according to an embodiment of the invention.

FIG. 1 is a schematic diagram of a tandem-type color image forming apparatus according to an embodiment of the present invention.

A color image forming apparatus 10 has an optical scanner 12 disposed upright in an approximate center of the apparatus. From the optical scanner 12, on the basis of color data of C (cyan), M (magenta), Y (yellow), and K (black) generated by a controller 54, light beams (hereinbelow, also called scan beams) AY, AM, AC, and AK corresponding to the colors are output to the left in FIG. 1.

On the left side of the optical scanner 12 in FIG. 1, in order from the top in the vertical direction, photosensitive drums 14Y, 14M, 14C, and 14K (hereinbelow, also generically called photosensitive drums 14) are disposed in series. Near the photosensitive drums 14Y, 14M, 14C, and 14K, corresponding chargers 16Y, 16M, 16C, and 16K (hereinbelow, also generically called chargers 16) and developers 18Y, 18M, 18C, and 18K (hereinbelow, also generically called developers 18) are disposed, respectively.

By the optical scanner 12, photosensitive drums 14, chargers 16, developers 18, and the like, an engine part 10A of the color image forming apparatus 10 is constructed.

The photosensitive drum 14 is charged by the charger 16 and its drum surface is scanned with and exposed to an optical beam from the optical scanner 12, thereby forming an electrostatic latent image.

The electrostatic latent image is developed by the developer 18, thereby obtaining toner images of the colors. In combinations of Y and M colors, and C and K colors, the toner images are transferred to primary intermediate transfer members 20YM and 20CK respectively. The images are transferred from the primary intermediate transfer members 20YM and 20CK to a secondary intermediate transfer member 22 where the images are overlapped. Near the secondary intermediate transfer member 22, a transfer charger 24 for charging the secondary intermediate transfer member 22 and a cleaner 26 for collecting discarded toner from the secondary intermediate transfer member 22 are disposed. The primary intermediate transfer members 20YM and 20CK, the secondary intermediate transfer member 22, and the above-described image forming components are rotated by the driving force of a drive motor (MOT) 27. The driving of the motor 27 is controlled by a signal from the controller 54.

Toner images colorized on the secondary intermediate transfer member 22 are transferred together from the secondary intermediate transfer member 22 onto a recording sheet 30 fed from a paper feeding cassette 28 in the lower part of the apparatus. When the recording sheet 30 is sent to a fixer 32 disposed at the top of the secondary intermediate transfer member 22 in FIG. 1, the transfer image becomes a fixed image.

By this process, a color image is formed on the recording sheet 30 by the color image forming apparatus 10 and the recording sheet 30 is ejected onto an ejection tray 34 at the top of the apparatus.

In this configuration, the controller 54 generates CMYK data to be transmitted to the optical scanner 12, from image data of R (red), G (green), and B (blue) input from the outside.

Figure 2:
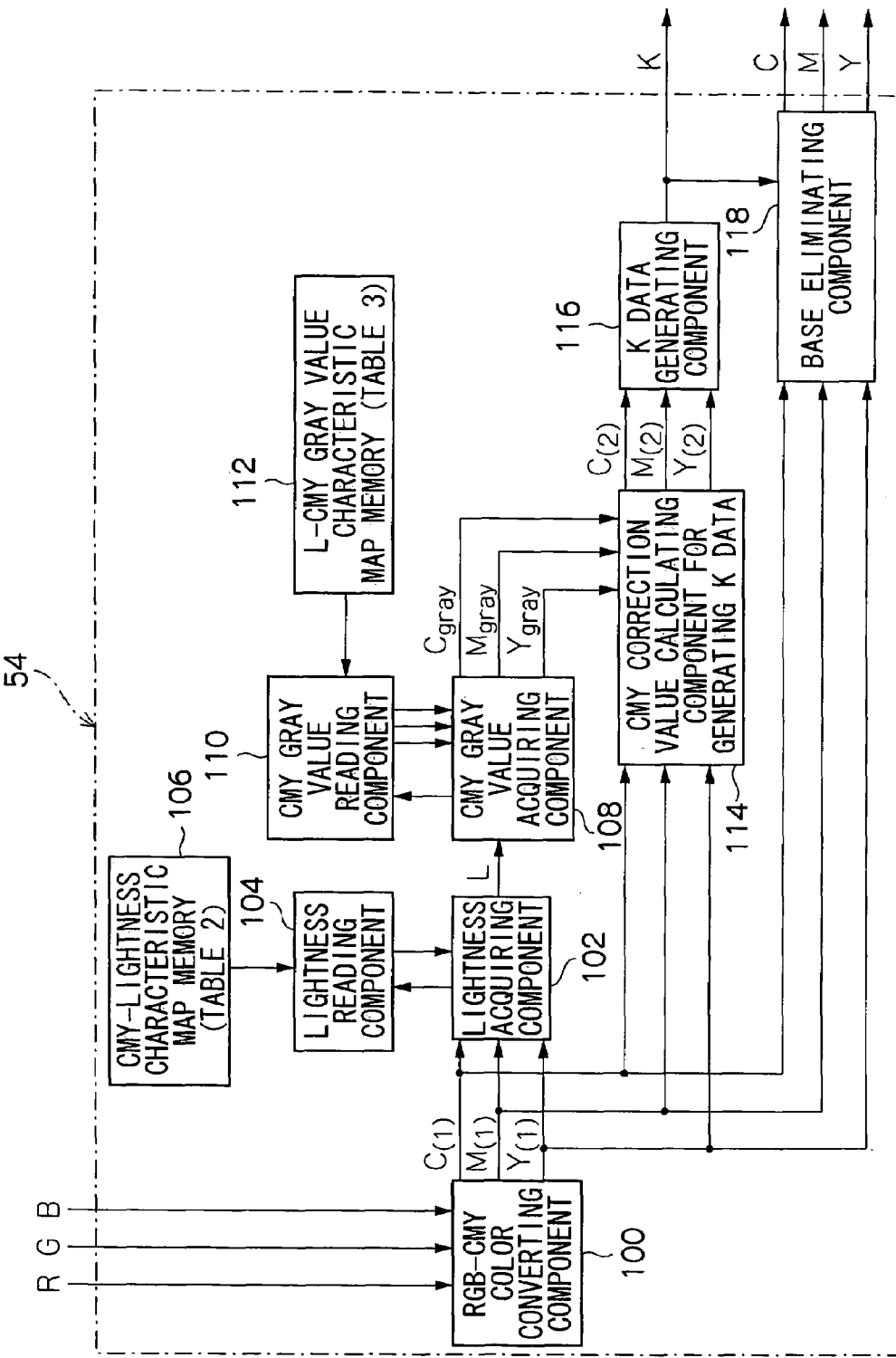
FIG. 2 is a functional block diagram for control of a color converting process in a controller of the image forming apparatus.

FIG. 2 is a control block diagram for generating the CMYK data in the controller 54. As described above, the controller 54 executes various control such as the driving control of the motor 27, charging control of the charger 16, development control of the developer 18, fixing control of the fixer 32, and carriage control of the recording sheet 30. With reference to FIG. 2, only the control for generating CMYK data from RGB data will be described.

The block diagram of FIG. 2 shows functional blocks but does not limit the hardware configuration of the invention.

RGB data from the outside is input to an RGB-CMY color converting component 100. In the RGB-CMY color converting component 100, an RGB-CMY conversion map shown in Table 1 is stored, and CMY data corresponding to the RGB data is read from the map and sent to the RGB-CMY color converting component 100. In the embodiment, each of the R, G, and B data is 8-bit (256-shade) data, each of the C, M, and Y data is percentage (%) data, and, in reality, there are $256^3$ conversion patterns.

TABLE 1

| R (8 bits) | G (8 bits) | B (8 bits) | C(%) | M(%) | Y(%) |
|---|---|---|---|---|---|
| 0 | 0 | 0 | 100 | 100 | 90 |
| 0 | 0 | 16 | 100 | 100 | 86 |
| 0 | 0 | 17 | 98 | 98 | 85 |
| . | . | . | . | . | . |
| . | . | . | . | . | . |
| 255 | 255 | 240 | 0 | 0 | 8 |
| . | . | . | . | . | . |
| . | . | . | . | . | . |
| 255 | 255 | 255 | 0 | 0 | 0 |

The data read by the RGB-CMY color converting component 100 is transmitted as $C_{(1)}$, $M_{(1)}$, and $Y_{(1)}$ data to a lightness acquiring component 102.

The lightness acquiring component 102 acquires lightness based on the $C_{(1)}$, $M_{(1)}$, and $Y_{(1)}$ data. To acquire the lightness, a lightness reading component 104 is connected to the lightness acquiring component 102. A CMY-lightness characteristic map memory 106 is connected to the lightness reading component 104 and stores a CMY-lightness characteristic map shown in Table 2. As the lightness, a numerical value indicated by L* in the L*a*b* calorimetric system is applied.

TABLE 2

| C(%) | M(%) | Y(%) | L* (lightness) |
|---|---|---|---|
| 0 | 0 | 0 | 95 |
| 0 | 0 | 20 | 93 |
| . | . | . | . |
| . | . | . | . |

TABLE 2-continued

| C(%) | M(%) | Y(%) | L* (lightness) |
|---|---|---|---|
| 80 | 80 | 60 | 32 |
| 80 | 80 | 80 | 30 |
| . | . | . | . |
| . | . | . | . |
| 100 | 100 | 80 | 26 |
| 100 | 100 | 100 | 20 |

The CMY-lightness characteristic map is determined on the basis of the balance between C and M colors which are conspicuous to human eyes and the Y color which is not conspicuous to human eyes, and the characteristics of the engine part 10A of the image forming apparatus. The maximum lightness in the embodiment is 95, and the minimum lightness is 20.

In Table 2, six levels (0%, 20%, 40%, 60%, 80%, and 100%) are set for each of the $C_{(1)}$, $M_{(1)}$, and $Y_{(1)}$ data, and a map of $6^3$ patterns is used by the combinations of the colors.

For example, when the $C_{(1)}$, $M_{(1)}$, and $Y_{(1)}$ data is 80%, 80%, and 60%, respectively, 32 can be read as lightness from Table 2.

On the other hand, when the $C_{(1)}$, $M_{(1)}$, and $Y_{(1)}$ data is 88%, 87%, and 76%, respectively, corresponding lightness does not exist in Table 2.

In such a case, approximate values are selected. Approximate values are selected in such a manner that ranges of $0 \leq CMY < 10$, $10 \leq CMY < 30$, $30 \leq CMY < 50$, $50 \leq CMY < 70$, $70 \leq CMY < 90$, $90 \leq CMY \leq 100$ are determined by using the levels as references, a range in which the data is actually included is extracted, and lightness is set. Since "88%, 87%, 76%" is close to "80%, 80%, 80%" in Table 2, 30 is selected as lightness.

The lightness L* acquired by the lightness acquiring component 102 is transmitted to a CMY gray value acquiring component 108. The CMY gray value acquiring component 108 acquires Cgray, Mgray, and Ygray data at which a combination of the CMY data becomes a gray value on the basis of the lightness L*.

For this purpose, the CMY gray value acquiring component 108 is connected to a CMY gray value reading component 110. The CMY gray value reading component 110 has the role of reading the Cgray, Mgray, and Ygray data from the L-CMY gray value characteristic map (refer to Table 3) stored in an L-CMY gray value characteristic map memory 112 on the basis of the lightness L* input from the CMY gray value acquiring component 108, and transmitting the data to the CMY gray value acquiring component 108.

TABLE 3

| L* (lightness) | Cgray | Mgray | Ygray |
|---|---|---|---|
| 95 | 0 | 0 | 0 |
| 90 | 5 | 5 | 4 |
| ... | ... | ... | ... |
| 35 | 82 | 81 | 70 |
| 30 | 88 | 87 | 76 |
| 25 | 94 | 93 | 83 |
| 20 | 100 | 100 | 90 |

Figure 3:
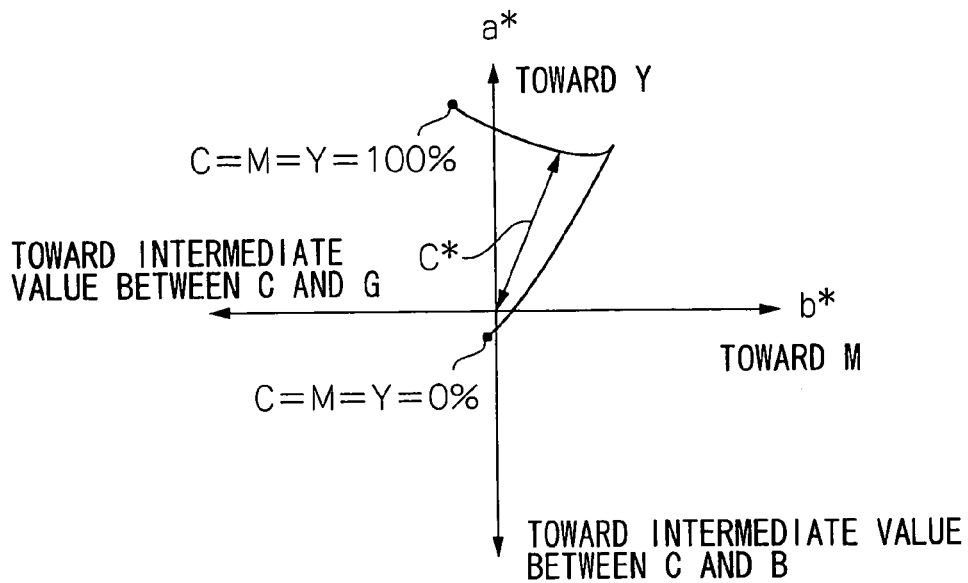
FIG. 3 is a color balance characteristic diagram when C=M=Y in the L*a*b* colorimetric system.
Figure 4:
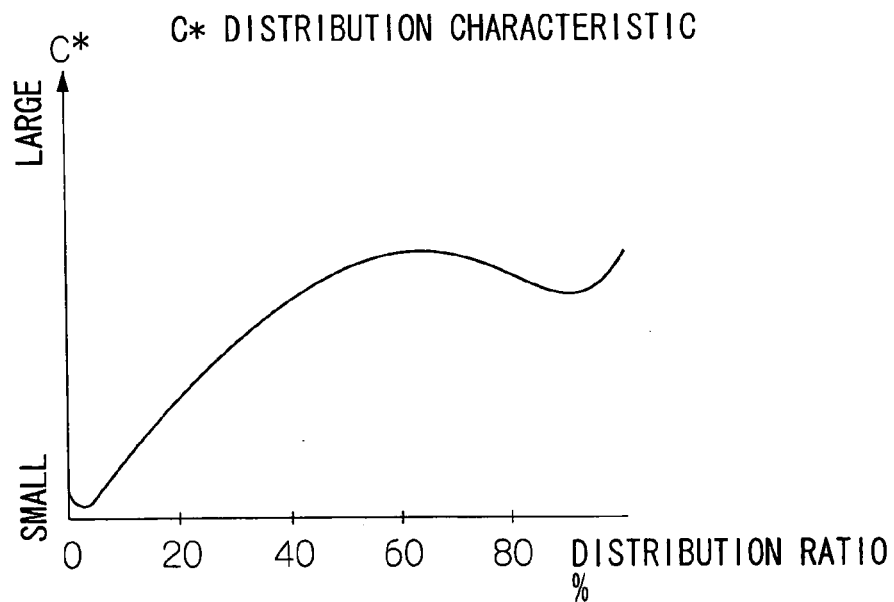
FIG. 4 is a c* distribution characteristic diagram in the characteristics of FIG. 3.

FIG. 3 is a characteristic diagram of the L*a*b* calorimetric system in the characteristic of the engine part 10A of the image forming apparatus 10 in the embodiment and shows a color balance change characteristic when a data value in a state where C=M=Y is displaced from 0% to 100%. As understood from FIG. 1, although the data value does not move from the origin inherently (theoretically), the data largely changes according to density of the colors.

Figure 5:
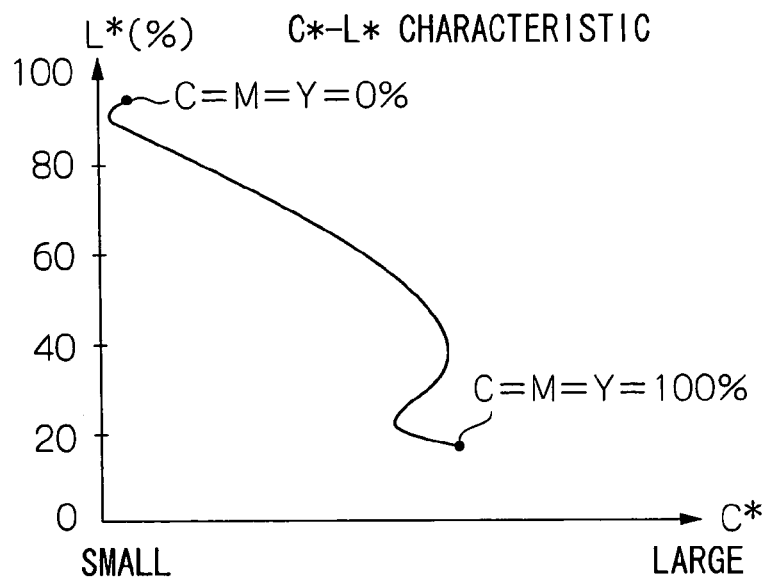
FIG. 5 is a c*-L* characteristic diagram in the characteristics of FIG. 3.

FIG. 5 shows the relation between the distance c* from the origin (a*=b*=0) in the FIG. 3 and the Z axis (L* axis) in FIG. 3. It is understood that when the distance from the origin of lightness changes, an influence is exerted on lightness. In other words, it can be said that, in many cases, when a gray value of CMY is obtained according to the lightness L*, C≠M≠Y.

Based on the above, the grounds of Table 3 will be described. When a gray value of CMY is obtained according to the lightness L*, the occupation ratios of data of C, M, and Y are different from each other. When the lightness L* is known, an accurate CMY gray value can be obtained.

As shown in FIG. 5, even when amounts of C, M, and Y are equal to each other, the lightness L* changes according to the density.

In the case of showing the above (the characteristic of FIG. 1) by the relation between the change amount c* and L*, as shown in FIG. 5, even when the amounts of C, M, and Y are equal to each other, the lightness L* changes according to the density.

Figure 6:
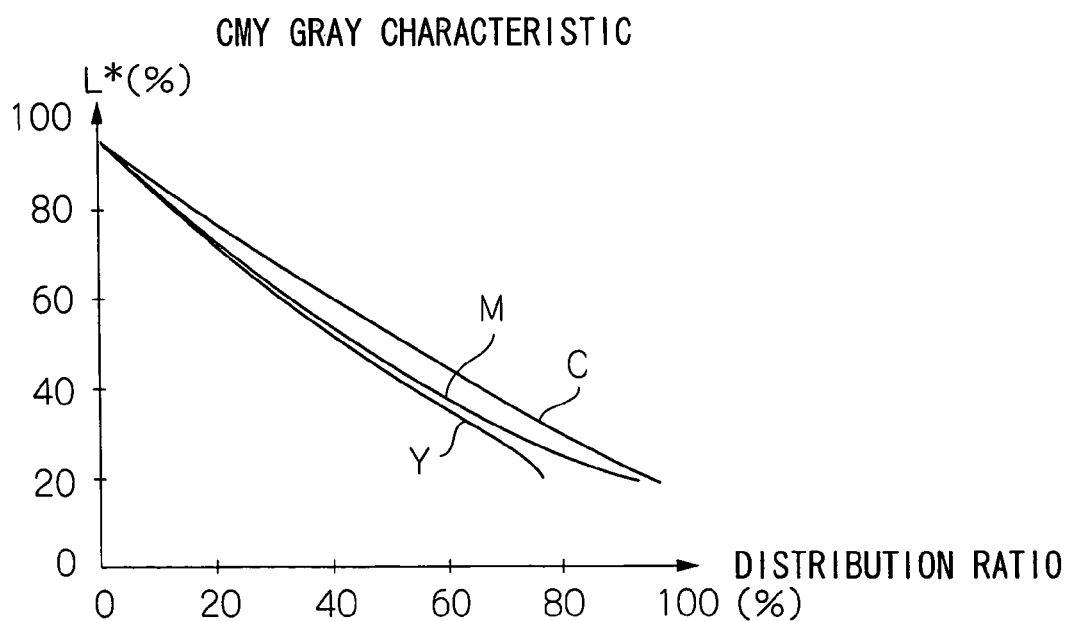
FIG. 6 is a CMY gray value characteristic diagram in the characteristics of FIG. 3.

When the CMY gray value is obtained in such a characteristic (characteristic of dependency on the engine part 10A), it is expressed as shown by a CMY gray characteristic diagram of FIG. 6. Table 3 shows the CMY gray value map obtained by expressing the characteristic diagram of FIG. 6 by numerical values and stored.

Accurate CMY gray values (Cgray, Mgray, and Ygray data) obtained by the CMY gray value acquiring component 108 are transmitted to a CMY correction value calculating component 114 for generating K.

To the CMY correction value calculating component 114 for generating K, the $C_{(1)}$, $M_{(1)}$, and $Y_{(1)}$ data obtained by conversion of the RGB-CMY color converting component 100 is input. Basically, the CMY correction value calculating component 114 generates $C_{(2)}$, $M_{(2)}$, and $Y_{(2)}$ data as references to generate K data by subtracting the CMY gray values (Cgray, Mgray, and Ygray data) from the $C_{(1)}$, $M_{(1)}$, and $Y_{(1)}$ data.

However, if the Cgray, Mgray, and Ygray data is simply subtracted from the $C_{(1)}$, $M_{(1)}$, and $Y_{(1)}$ data, the $C_{(2)}$, $M_{(2)}$, and $Y_{(2)}$ data itself becomes small values, and precision of calculation deteriorates.

Consequently, in the embodiment, all of the $C_{(2)}$, $M_{(2)}$, and $Y_{(2)}$ data are raised by the minimum values of the Cgray, Mgray, and Ygray data. The operation is expressed as shown by the following equation (2).

$$C_{(2)} \cdot M_{(2)} \cdot Y_{(2)} = C_{(1)} \cdot M_{(1)} \cdot Y_{(1)} + \mathrm{Min}(C\mathrm{gray} \cdot M\mathrm{gray} \cdot Y\mathrm{gray}) - C\mathrm{gray} \cdot M\mathrm{gray} \cdot Y\mathrm{gray} \qquad (2)$$

When the $C_{(1)}$, $M_{(1)}$, and $Y_{(1)}$ data is 88%, 87%, and 76%, respectively, and gray is expressed, in the case where Cgray, Mgray, and Ygray data corresponding to the lightness L* at the values is 88%, 87%, and 76% (in this case, the data coincides with the $C_{(1)}$, $M_{(1)}$, and $Y_{(1)}$ data), the $C_{(2)}$, $M_{(2)}$, and $Y_{(2)}$ data is 76%, 76%, and 76%, respectively, in the equation (2).

On the other hand, when the $C_{(1)}$, $M_{(1)}$, and $Y_{(1)}$ data is 75%, 75%, and 75% and gray is not expressed in practice, in the case where Cgray, Mgray, and Ygray data corresponding to the lightness L* at the values is 78%, 77%, and 66%, respectively, the $C_{(2)}$, $M_{(2)}$, and $Y_{(2)}$ data is 63%, 64%, and 66%, respectively, in the equation (2).

The $C_{(2)}$, $M_{(2)}$, and $Y_{(2)}$ data obtained by calculation in the CMY correction value calculating component 114 for generating K is transmitted to a K generating component 116.

The K generating component 116 generates K data by using, as a reference, the difference between the maximum value and the minimum value of the $C_{(2)}$, $M_{(2)}$, and $Y_{(2)}$ data.

That is, the K data is calculated on the basis of the equation (3).

$$K = \mathrm{Min}(C_{(2)} \cdot M_{(2)} \cdot Y_{(2)}) - (\alpha Z + \beta) \qquad (3)$$

where Z is the difference between the maximum and minimum values of the $C_{(2)} \cdot M_{(2)} \cdot Y_{(2)}$ data, and α and β are coefficients determined by the start point of lightness and the ratio when K data is inserted.

It is understood from the equation (3) that, when the difference between the maximum and minimum values of the $C_{(2)} \cdot M_{(2)} \cdot Y_{(2)}$ data is zero, the data K becomes the maximum. However, the difference between the maximum and minimum values of the $C_{(2)}$, $M_{(2)}$, and $Y_{(2)}$ data (63%, 64%, 66%) is not zero because of correction, so that the K data does not become the maximum in a slightly colored part.

The coefficients α and β will now be described.

Figure 7:
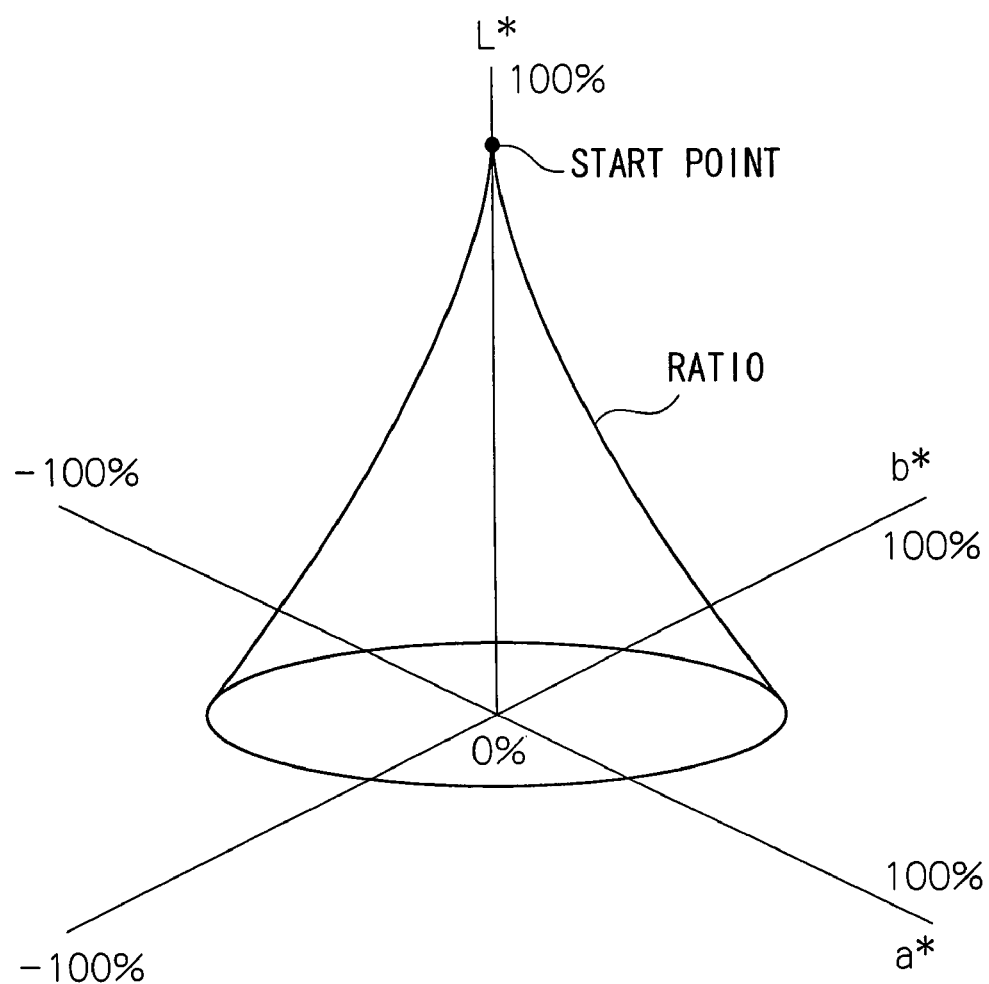
FIG. 7 is a three-dimensional characteristic diagram of the L*a*b* calorimetric system showing a start point of insertion (subtraction) of K data and a ratio of insertion (subtraction) of K data.

FIG. 7 shows the relation between an insertion amount of the K data and lightness by three-dimensional axes (x axis denotes a*, y axis denotes b*, and z axis indicates L*). As shown in FIG. 7, a region of inserting K data can be expressed by an almost conical shape, and a characteristic curve (determined by the characteristic of the engine part 10A) in which as the lightness decreases from the apex (upper limit value according to lightness) of the conical-shape characteristic decreases, the amount of conversion to K data gradually increases is obtained.

The K data obtained by the equation (3) is applied as K data at the time of forming an image and is also transmitted to a base eliminating component 118.

To the base eliminating component 118, the $C_{(1)}$, $M_{(1)}$, and $Y_{(1)}$ data obtained by the conversion in the RGB-CMY color converting component 100 is input. Basically, by subtracting the K data, CMY data is generated.

Coefficients γ and σ as shown in the equation (4) are added so as to correspond to α and β used for generating the K data.

$$C \cdot M \cdot Y = C_{(1)} \cdot M_{(1)} \cdot Y_{(1)} - (\gamma K + \sigma) \qquad (4)$$

where γ and σ are coefficients determined by the start point of lightness and the ratio at the time of erasing K data By the equation (4), CMY data to be applied as CMY data for forming an image is generated.

Figure 8:
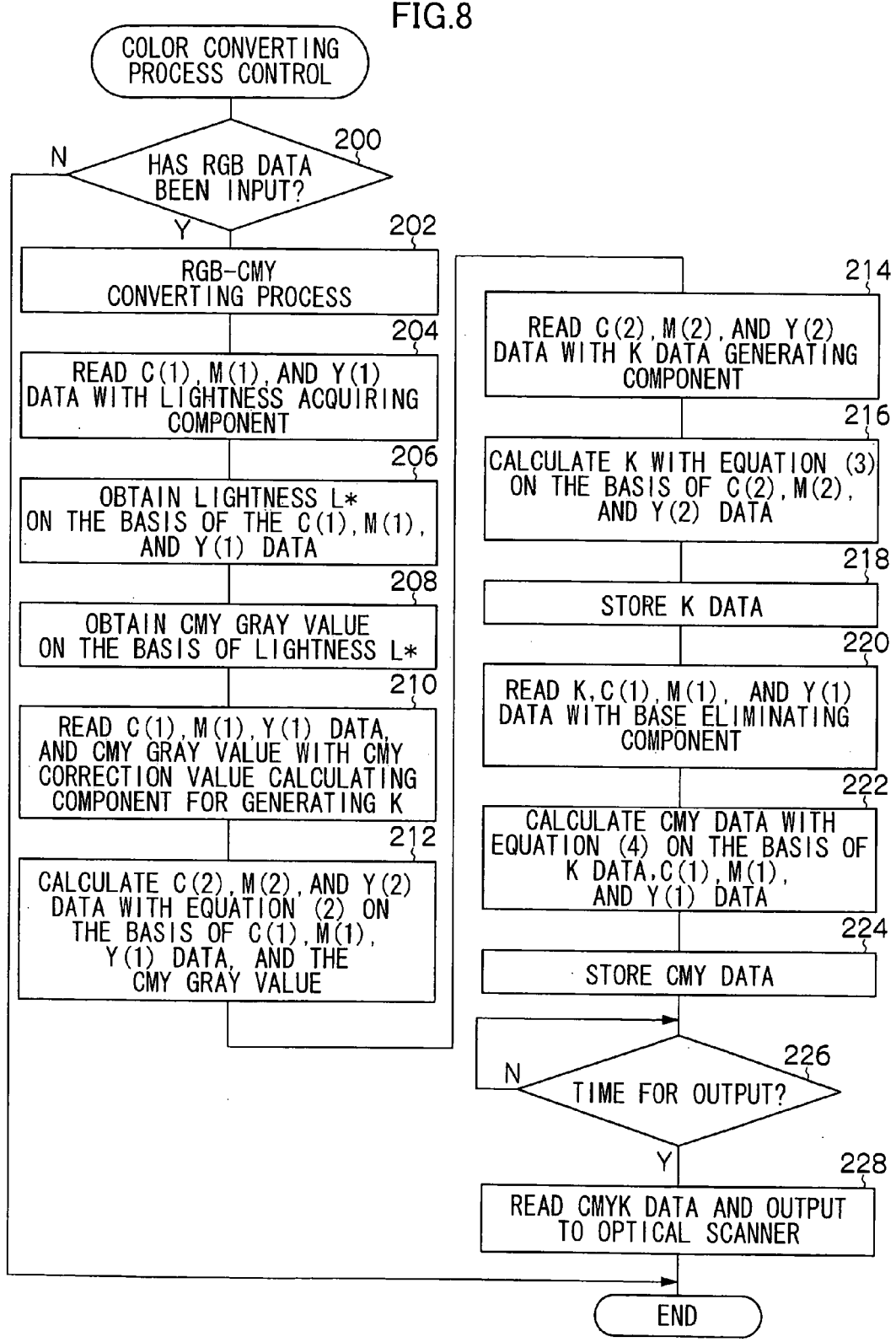
FIG. 8 is a flowchart showing a color converting process control routine in the embodiment of the invention.

The operation of the embodiment will be described hereinbelow with reference to the flowchart of FIG. 8.

First, in step 200, whether RGB data is input from the outside (of the host computer or the like) or not is determined. If the determination is affirmative, the procedure proceeds to step 202 where an RGB-CMY converting process (generation of $C_{(1)}$, $M_{(1)}$, and $Y_{(1)}$ data) is executed (refer to Table 1). If the determination in step 200 is negative, the routine is finished.

When the converting process in step 202 is finished, the procedure advances to step 204 where the $C_{(1)}$, $M_{(1)}$, and $Y_{(1)}$ data is read by the lightness acquiring component 102. After that, the procedure advances to step 206, and the lightness L* is acquired on the basis of the $C_{(1)}$, $M_{(1)}$, and $Y_{(1)}$ data. Control for acquiring the lightness L* in step 206 (refer to FIG. 9) will be described later.

In step 208, on the basis of the lightness L* acquired in step 206, C, M, and Y gray values (Cgray, Mgray, and Ygray data) are acquired. Control for acquiring the C, M, and Y gray values (Cgray, Mgray, and Ygray data) (refer to FIG. 10) in step 208 will be described later.

In step 210, the $C_{(1)}$, $M_{(1)}$, and $Y_{(1)}$ data and the C, M, and Y gray values (Cgray, Mgray, and Ygray data) are read by the CMY correction value calculating component 114 for generating K data. After that, the procedure shifts to step 212 where $C_{(2)}$, $M_{(2)}$, and $Y_{(2)}$ data necessary for generating K data is calculated using the equation (2) on the basis of the $C_{(1)}$, $M_{(1)}$, and $Y_{(1)}$ data and the C, M, and Y gray values (Cgray, Mgray, and Ygray data).

In step 214, the $C_{(2)}$, $M_{(2)}$, and $Y_{(2)}$ data is read by the K data generating component 116. In step 216, on the basis of the $C_{(2)}$, $M_{(2)}$, and $Y_{(2)}$ data, K data is calculated by the equation (3). The procedure shifts to step 218 where the calculated K data is stored.

In step 220, the base eliminating component 118 reads the calculated K data and the $C_{(1)}$, $M_{(1)}$, and $Y_{(1)}$ data. In step 222, on the basis of the K data and the $C_{(1)}$, $M_{(1)}$, and $Y_{(1)}$ data, C, M, and Y data is calculated by the equation (4). The procedure shifts to step 224 where the C, M, and Y data is stored.

As a result, generation of the C, M, Y, and K data from the RGB data is completed. In step 226, whether it is a time for output or not is determined. If the determination is affirmative, the procedure proceeds to step 228 where the stored C, M, Y, and K data is read and output to the optical scanner 12 (refer to FIG. 1).

A lightness acquisition control subroutine in step 206 (refer to FIG. 8) will now be described with reference to the flowchart of FIG. 9.

First, in step 250, a variable "n" (the number of data) is set to 1. In step 252, the n-th $C_{(1)}$, $M_{(1)}$, and $Y_{(1)}$ data is transmitted to the lightness reading component 104.

In step 254, on the basis of the n-th $C_{(1)}$, $M_{(1)}$, and $Y_{(1)}$ data, the lightness reading component 104 extracts the lightness L* from the CMY-lightness characteristic map (refer to Table 2) stored in the CMY-lightness characteristic map memory 106, and the procedure shifts to step 256. In step 256, the extracted lightness L* is sent back from the lightness reading component 104 to the lightness acquiring component 102, and the procedure shifts to step 258.

In step 258, whether the process has been finished for all data or not is determined. If the determination is negative, the procedure shifts to step 260 where the variable "n" is incremented. The procedure returns to step 252 and is repeated. If the determination in step 258 is affirmative, it is determined that acquisition of the lightness L* of all data has been completed and the procedure returns.

Based on the flowchart of FIG. 10, the CMY gray value acquisition control subroutine in the step 208 (refer to FIG. 8) will now be described.

First, in step 270, the variable "n" (the number of data) is set to 1. In step 272, the n-th lightness L* is transmitted to the CMY gray value reading component 110.

In step 274, on the basis of the n-th lightness L*, the CMY gray value reading component 110 extracts C, M, and Y gray values (Cgray, Mgray, and Ygray data) from the L-CMY characteristic map (refer to Table 3) stored in the L-CMY characteristic map memory 112, and the procedure shifts to step 276. In step 276, the extracted C, M, and Y gray values (Cgray, Mgray, and Ygray data) are sent back from the CMY gray value reading component 110 to the CMY gray value acquiring component 108, and the procedure shifts to step 278.

In step 278, whether the process has been finished for all data or not is determined. If the determination is negative, the procedure shifts to step 280 where the variable "n" is incremented. The procedure returns to step 272 and is repeated. If the determination in step 278 is affirmative, it is determined that acquisition of the lightness L* of all data has been completed and the procedure returns.

Figure 9:
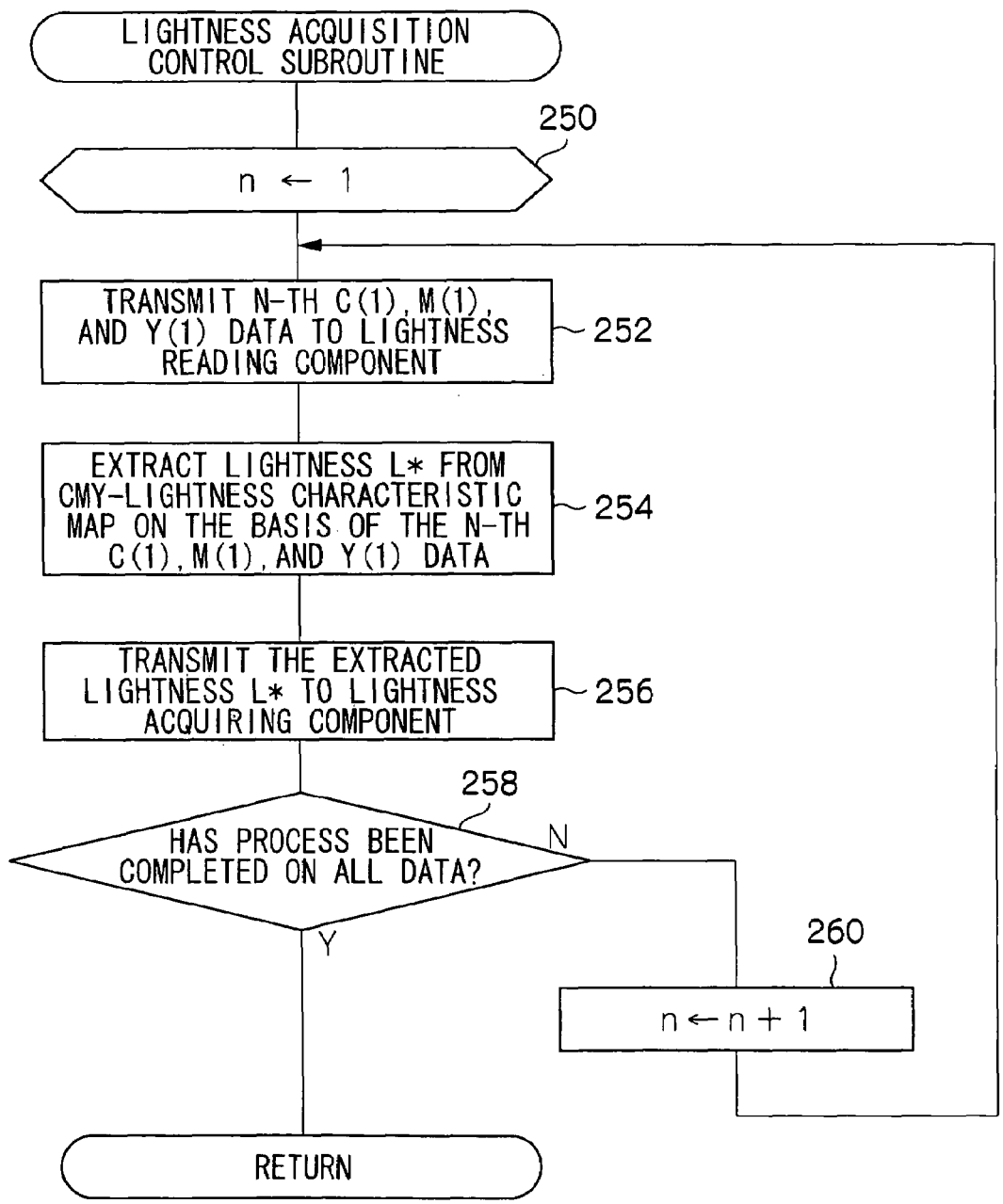
FIG. 9 is a flowchart showing a lightness acquisition control subroutine in step 206 in FIG. 8.
Figure 10:
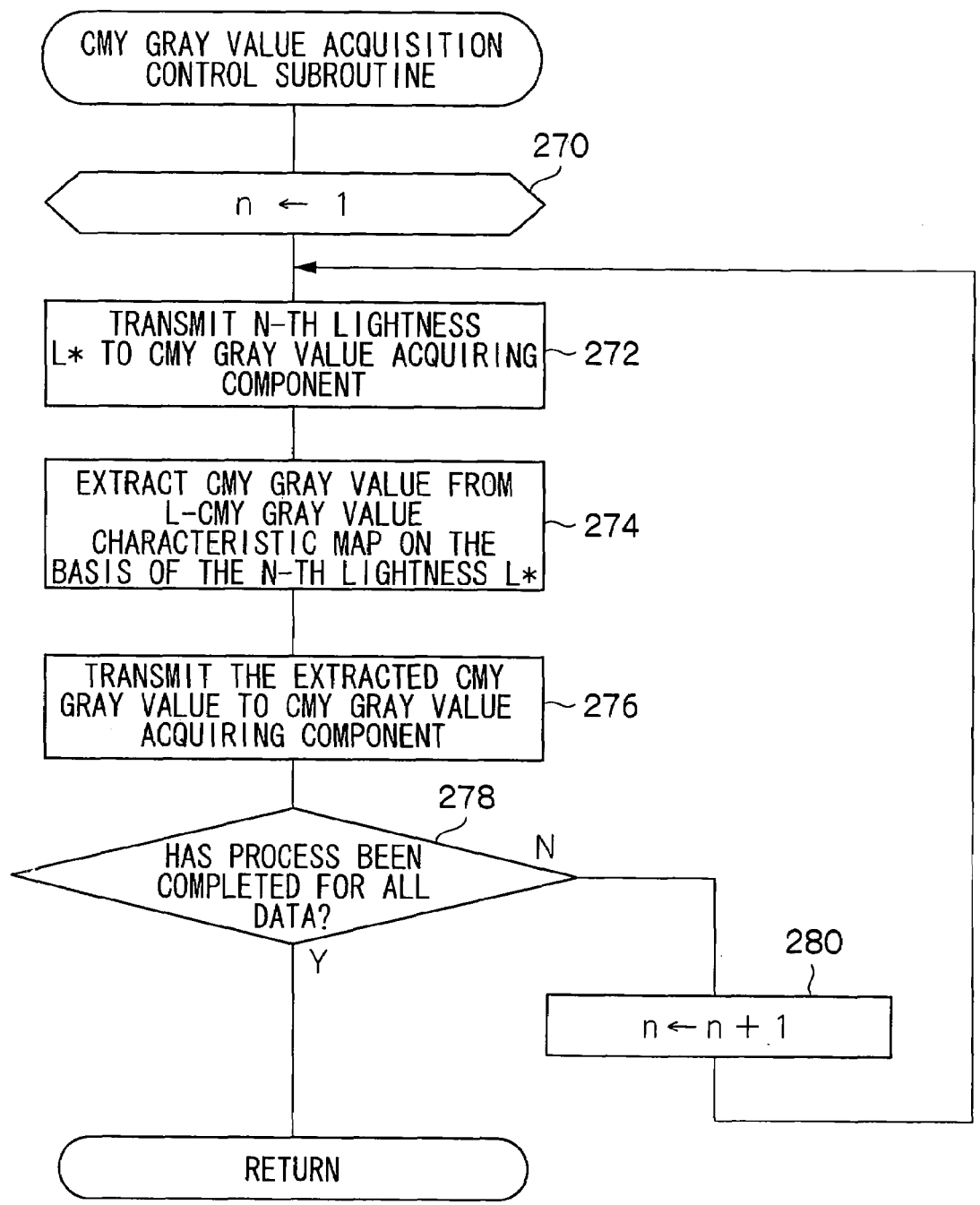
FIG. 10 is a flowchart showing a CMY gray value acquisition control subroutine in step 208 in FIG. 8.

Although FIGS. 9 and 10 show that data is sequentially processed by software, data may be continuously processed as in a so-called pipeline process.

As described above, in the embodiment, considering that gray is not obtained even when amounts of C, M, and Y are equal to each other and the CMY data indicative of a gray value (CMY gray values) changes according to lightness, by calculating the C, M, and Y data ($C_{(2)}$, $M_{(2)}$, and $Y_{(2)}$ data) for generating K data in consideration of unbalance of the C, M, and Y gray values depending on the characteristic of the engine part 10A of the image forming apparatus 10 at the time of generating K data, optimum K data can be obtained.

In the embodiment, in the case of acquiring the lightness L* from the $C_{(1)}$, $M_{(1)}$, and $Y_{(1)}$ data subjected to the converting process on the basis of input RGB data, the table shown in Table 2 is generated and stored in the CMY-lightness characteristic map memory 106 in advance. Alternatively, the lightness L* may be obtained by an arithmetic expression (refer to Equation (1)) using the $C_{(1)}$, $M_{(1)}$, and $Y_{(1)}$ data as main parameters.

$$L = L\max - z(0.45a \times C_{(1)} + 0.45b \times M_{(1)} + 0.1c \times Y_{(1)}) \quad (1)$$

Figure 11:
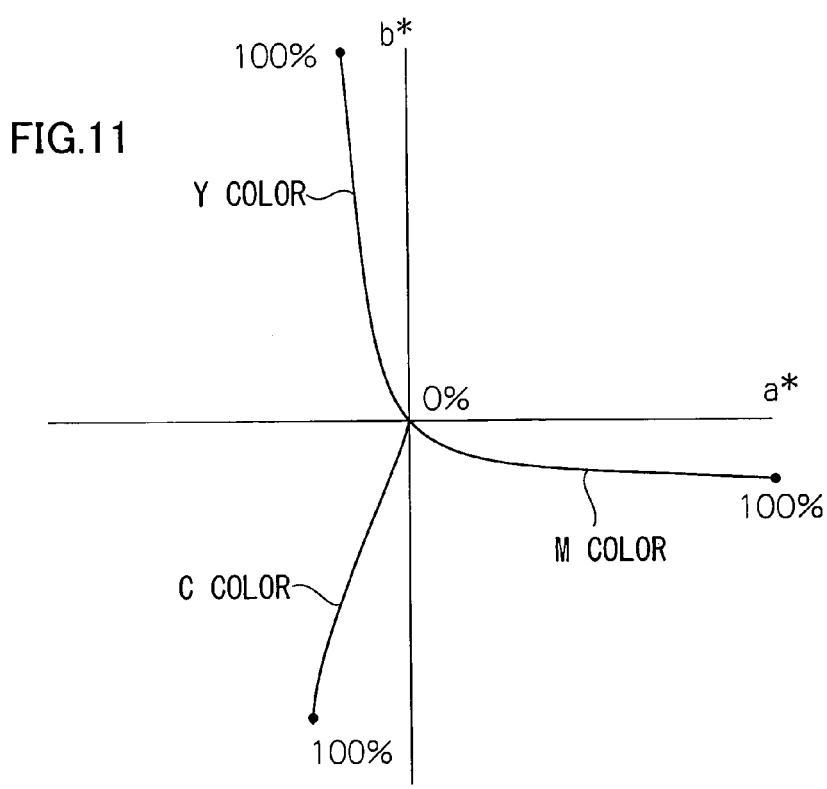
FIG. 11 is a characteristic diagram showing a color change according to the density of each of the colors in the L*a*b* calorimetric system.

The basis for Equation (1) is that, as shown in FIG. 11, when a data value gradually increases (to a maximum of 100%) from the origin (data value=0%) in the L*a*b* colorimetric system, the distance from the origin increases.

Figure 12:
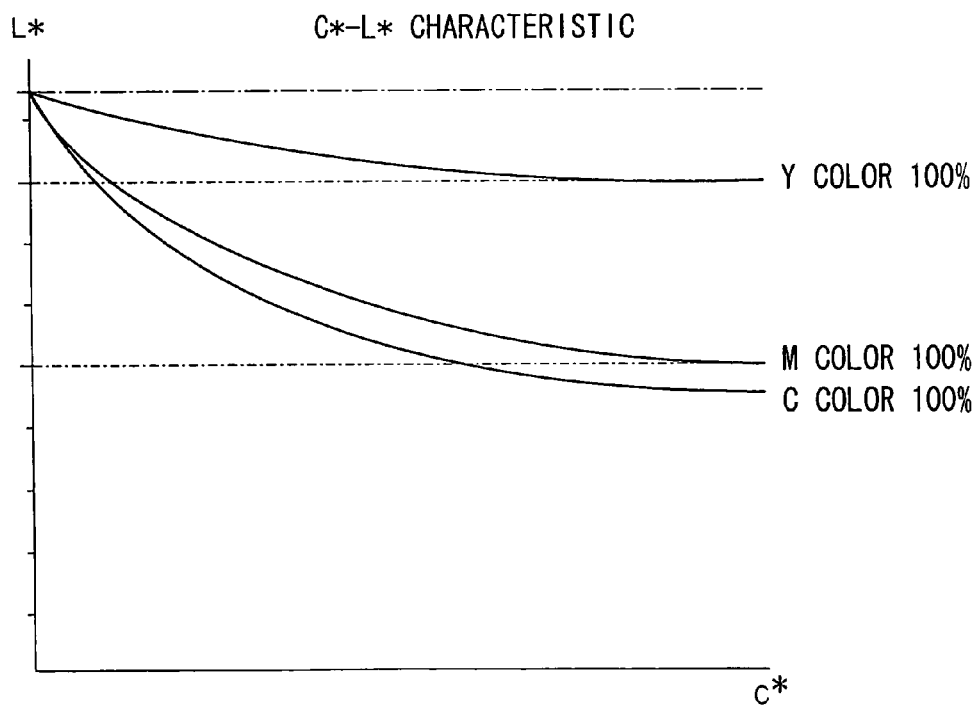
FIG. 12 is a c*-L* characteristic diagram in the characteristics of FIG. 11.

FIG. 12 shows the relation between the distance from the origin and the L*axis as the z axis of FIG. 11. As shown in FIG. 12, as the distance from the origin increases, the more the lightness decreases. An amount of change of the Y color which is not conspicuous to human eyes is smaller than those of the other colors (C and M colors).

It is understood from FIG. 12 that the maximum value of lightness is generally 95% and a change in the lightness of the Y color is about 10% (=95−85) and, on the other hand, a change in the lightness of the C and M colors reaches about 45% (95−50). Since dependency on the lightness varies among the colors (C:M:Y=45%:45%: 10%=0.45:0.45:0.1), the values are used as amounts of dependency on lightness and are integrated together with factors a, b, and c depending on the characteristic of the image forming engine into the $C_{(1)}$, $M_{(1)}$, and $Y_{(1)}$ data, respectively, thereby enabling the degree of influence exerted on the lightness of the $C_{(1)}$, $M_{(1)}$, and $Y_{(1)}$ data to be obtained (the factor z denotes a correction factor depending on the characteristic of the image forming engine). By subtracting the degree of influence from the maximum value Lmax of the lightness, lightness L can be obtained.

The invention described above is characterized in that the lightness acquiring component acquires lightness from a pre-stored table of lightness based on the $C_{(1)}$, $M_{(1)}$, and $Y_{(1)}$ data depending on the characteristic of the image forming engine.

The table is characterized in that the $C_{(1)}$, $M_{(1)}$, and $Y_{(1)}$ data is divided into ranges, and lightness is set for each of divided ranges.

Specifically, when the balance of all of the $C_{(1)} \cdot M_{(1)} \cdot Y_{(1)}$ data is considered, the data amount becomes huge. Consequently, when each color data is expressed by numerical values of 0 to 100 and the numerical values are divided into about 6 levels (0, 20, 40, 60, 80, and 100), the number of combinations of levels becomes $6^3$ (=216), and the data amount can be reduced.

More specifically, it is sufficient to preliminarily determine lightness in each of ranges of 0≦CMY<10, 10≦CMY<30, 30≦CMY<50, 50≦CMY<70, 70≦CMY<90, and 90≦CMY≦100 by using the dividing points as references, extract a range in which the data is actually included, and set the lightness in the range.

The invention is also characterized in that the lightness acquiring component acquires lightness L by arithmetic operation of the following equation (1) when lightness as a reference of white color is set as Lmax and correction factors depending on the characteristic of the image forming engine are set as a, b, c, and z.

$$L = L\max - z(0.45a \times C_{(1)} + 0.45b \times M_{(1)} + 0.1c \times Y_{(1)}) \quad (1)$$

Although a table is pre-stored in the above example, alternatively, the lightness may be obtained by the arithmetic expression (Equation (1)) in which the factors depending on the characteristic of the image forming engine are preliminarily determined.

The basis for the arithmetic expression is that, in the case where the origin is C=Y=M=0% in the L*a*b* colorimetric system, as a data value gradually increases (to the maximum of 100%), the distance from the origin of a point expressing L*a*b* at that time increases.

The relation between the distance from the origin and the lightness L* is that, the more the distance from the origin increases, the more the lightness decreases. An amount of change of the Y color which is not conspicuous to human eyes is smaller than those of the other colors (C and M colors).

The maximum value of lightness L* is generally 95%, and an amount of change of the lightness of Y color is about 10 points (=95−85), while a change in the lightness of the C and M colors is about 45 points (95−50). Since dependency on the lightness varies among the colors (C:M:Y=45%:45%:10%=0.45:0.45:0.1), the values are used as amounts of dependency on the lightness and are integrated together with factors a, b, and c depending on the characteristic of the image forming engine into the $C_{(1)} \cdot M_{(1)} \cdot Y_{(1)}$ data, respectively, thereby enabling the degree of influence exerted on the lightness of the $C_{(1)} \cdot M_{(1)} \cdot Y_{(1)}$ data to be obtained (the factor z denotes a correction factor depending on the characteristic of the image forming engine). By subtracting the degree of influence from the maximum value Lmax of the lightness, lightness L can be obtained.

What is claimed is:

1. An image processing apparatus on which an image forming engine for forming a full color image onto a recording medium by using color materials corresponding to data of color tones on the basis of C (cyan), M (magenta), Y (yellow), and K (black) data is mounted, the image processing apparatus comprising:

a color converting component that converts R (red), G (green), and B (blue) data input from the outside to $C_{(1)}$, $M_{(1)}$, and $Y_{(1)}$ data which depends on a characteristic of the image forming engine;

a lightness acquiring component that acquires lightness from the $C_{(1)}$, $M_{(1)}$, and $Y_{(1)}$ data obtained by the conversion of the color converting component;

a memory that stores a lightness-gray value characteristic table which depends on the characteristic of the image forming engine, is preset, and indicates gray value balance of the $C_{(1)}$, $M_{(1)}$, and $Y_{(1)}$ data with respect to lightness;

a gray value reading component that reads a gray value at the lightness acquired by the lightness acquiring component, from the memory;

a first arithmetic component that obtains $C_{(2)}$, $M_{(2)}$, and $Y_{(2)}$ data by subtracting the gray values read by the gray value reading component from the corresponding $C_{(1)}$, $M_{(1)}$, and $Y_{(1)}$ data derived by conversion by the color converting component;

a K data generating component that generates K data on the basis of the $C_{(2)}$, $M_{(2)}$, and $Y_{(2)}$ data; and a second arithmetic component that calculates C, M, and Y data by subtracting a base amount determined on the basis of the K data generated by the K data generating component from the $C_{(1)}$, $M_{(1)}$, and $Y_{(1)}$ data obtained by color conversion by the color converting component.

2. The image processing apparatus of claim 1, wherein the lightness acquiring component acquires lightness from a pre-stored table of lightness based on the $C_{(1)}$, $M_{(1)}$, and $Y_{(1)}$ data depending on the characteristic of the image forming engine.

3. The image processing apparatus of claim 2, wherein in the table, the $C_{(1)}$, $M_{(1)}$, and $Y_{(1)}$ data is divided into ranges, and lightness is set for each of the divided ranges.

4. The image processing apparatus of claim 1, wherein the lightness acquiring component acquires lightness L by arithmetic operation of the following equation (1) in which lightness as a reference of white color is set as Lmax and correction factors depending on the characteristic of the image forming engine are set as a, b, c, and z, $$L = L\max - z(0.45a \times C_{(1)} + 0.45b \times M_{(1)} + 0.1c \times Y_{(1)}) \quad (1).$$

5. An image processing method in an image processing apparatus on which an image forming engine for forming a full color image onto a recording medium by using color materials corresponding to data of color tones on the basis of C (cyan), M (magenta), Y (yellow), and K (black) data is mounted, the image processing method comprising:

(a) converting R (red), G (green), and B (blue) data input from the outside to $C_{(1)}$, $M_{(1)}$, and $Y_{(1)}$ data which depends on a characteristic of the image forming engine;

(b) acquiring lightness from the $C_{(1)}$, $M_{(1)}$, and $Y_{(1)}$ data obtained by the conversion in (a);

(c) storing a lightness-gray value characteristic table which depends on the characteristic of the image forming engine, is preset, and indicates gray value balance of the $C_{(1)}$, $M_{(1)}$, and $Y_{(1)}$ data with respect to lightness into a memory;

(d) reading a gray value at the lightness acquired in (b), from the memory;

(e) obtaining $C_{(2)}$, $M_{(2)}$, and $Y_{(2)}$ data by subtracting the gray values read in (d) from the corresponding $C_{(1)}$, $M_{(1)}$, and $Y_{(1)}$ data derived by conversion in (a);

(f) generating K data on the basis of the $C_{(2)}$, $M_{(2)}$, and $Y_{(2)}$ data; and (g) calculating C, M, and Y data by subtracting a base amount determined on the basis of the K data generated in (f) from the $C_{(1)}$, $M_{(1)}$, and $Y_{(1)}$ data obtained by color conversion in (a).

6. The image processing method of claim 5, wherein in (b), lightness is acquired from a pre-stored table of lightness based on the $C_{(1)}$, $M_{(1)}$, and $Y_{(1)}$ data depending on the characteristic of the image forming engine.

7. The image processing method of claim 6, wherein in the table, the $C_{(1)}$, $M_{(1)}$, and $Y_{(1)}$ data is divided into ranges, and lightness is set for each of the divided ranges.

8. The image processing method of claim 5, wherein in (b), lightness L is obtained by arithmetic operation of the following equation (1) in which lightness as a reference of white color is set as Lmax and correction factors depending on the characteristic of the image forming engine are set as a, b, c, and z, $$L = L\max - z(0.45a \times C_{(1)} + 0.45b \times M_{(1)} + 0.1c \times Y_{(1)}) \quad (1).$$

* * * * *